(12) United States Patent
Schmidt et al.

(10) Patent No.: US 11,294,373 B2
(45) Date of Patent: Apr. 5, 2022

(54) SYSTEM AND METHOD FOR ENERGY EFFICIENT PROGNOSTICS

(71) Applicant: GM Cruise Holdings LLC, San Francisco, CA (US)

(72) Inventors: Michael Frank Schmidt, Scottsdale, AZ (US); Chase Brian Kaufman, Fountain Hills, AZ (US); Samuel Harrison Glidden, Phoenix, AZ (US); Erik Birk Nielsen, Glendale, AZ (US); Jason Lee, Phoenix, AZ (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 271 days.

(21) Appl. No.: 16/371,008

(22) Filed: Mar. 31, 2019

(65) Prior Publication Data

US 2020/0310424 A1 Oct. 1, 2020

(51) Int. Cl.
*G05D 1/00* (2006.01)
*G06F 17/18* (2006.01)
*G07C 5/08* (2006.01)
*G07C 5/00* (2006.01)
*G05D 1/02* (2020.01)

(52) U.S. Cl.
CPC ......... *G05D 1/0088* (2013.01); *G05D 1/0291* (2013.01); *G06F 17/18* (2013.01); *G07C 5/006* (2013.01); *G07C 5/0808* (2013.01)

(58) Field of Classification Search
CPC .... G05D 1/0088; G05D 1/0291; G06F 17/18; G07C 5/006; G07C 5/0808
See application file for complete search history.

(56) References Cited

U.S. PATENT DOCUMENTS

| | | | |
|---|---|---|---|
| 8,954,225 B2 | 2/2015 | LaForge et al. | |
| 9,846,978 B1 | 12/2017 | Tseng et al. | |
| 9,927,813 B1 | 3/2018 | Ferguson et al. | |
| 10,095,239 B1 | 10/2018 | Wood et al. | |
| 10,137,903 B2 | 11/2018 | Tascione et al. | |
| 10,395,444 B1* | 8/2019 | Edren | G07C 5/0808 |
| 10,459,444 B1* | 10/2019 | Kentley-Klay | G05D 1/0027 |
| 2015/0170442 A1* | 6/2015 | Senalp | G07C 5/0808 |
| | | | 701/29.1 |
| 2016/0247106 A1* | 8/2016 | Dalloro | G06Q 10/06313 |
| 2019/0064793 A1* | 2/2019 | Sun | B60R 16/0236 |

* cited by examiner

*Primary Examiner* — Ramsey Refai
(74) *Attorney, Agent, or Firm* — Calfee, Halter & Griswold LLP

(57) ABSTRACT

Described herein is a server computing system that controls an autonomous vehicle to perform an operation to at least one of measure or isolate an effect of a variable on an actual power consumption by the autonomous vehicle. Data indicative of the actual power consumption, which is generated based on the operation, and data indicative of a projected power consumption, which is accumulated based on prior execution of the operation by a same or different autonomous vehicle, is received by the server computing system to determine whether an energy efficiency of the autonomous vehicle is degraded. The operation may be performed to identify a degraded vehicle system or component of the autonomous vehicle or to identify an autonomous vehicle in a fleet of autonomous vehicles for which further analysis is desirable. An output is generated by the server computing system that is indicative of the energy efficiency prognostics.

20 Claims, 7 Drawing Sheets

SYSTEM AND METHOD FOR ENERGY EFFICIENT PROGNOSTICS

BACKGROUND

An autonomous vehicle is a motorized vehicle that can operate without a human driver based on gas combustion, electric power provided from an internal battery, hybrid electric power, etc. In addition to supplying electric power to a vehicle propulsion system, for example, the battery may be configured to provide power to a plurality of components incorporated in the autonomous vehicle, such as a heating, a ventilating, and air conditioning (HVAC) system, an on-board computing system such as an autonomous driving system computer (ADSC), vehicle lights, amongst others. Further, efficiencies resulting from non-electric features, such as wheel alignment, weight of cabin contents, thermal resistance of cabin, etc., can also impact the amount of power that is drawn from the battery by way of resistance to electrically operated components. Thus, the range of an autonomous vehicle from a single battery charge is not strictly based on the miles travelled by the autonomous vehicle but, rather, is additionally dependent upon an amount of power consumed by operation of other vehicle components and systems.

In instances where a fleet of autonomous vehicles is being operated, it can be beneficial to reduce the amount of power consumed by the autonomous vehicles in order to increase ranges of the autonomous vehicles and thereby reduce the time and frequency at which the autonomous vehicles are removed from operation and incur miles to navigate back to a charging facility. Further, the more frequently that autonomous vehicles in the fleet are recharged, the larger the demand becomes on vehicle charging infrastructures to meet the needs of the fleet.

Moreover, as an autonomous vehicle ages, some components and systems of the autonomous vehicle wear, causing the efficiency of these components and systems to degrade from their original energy efficiency. For example, the fins of an air conditioning condenser may become dented over time by pebbles or debris launched from the road, thereby resulting in reduced heat transfer and increased power consumption to achieve a same output as could be provided from the condenser in its original, undamaged condition. When the efficiency of a component degrades by a sufficient amount, the benefit provided from replacing the component via energy conservation may exceed the cost of replacing the component.

SUMMARY

The following is a brief summary of subject matter that is described in greater detail herein. This summary is not intended to be limiting as to the scope of the claims.

Described herein are various technologies pertaining to a system and method of energy efficiency prognostics. With more specificity, described herein is a server computing system that comprises a data store having data indicative of a projected power consumption for an operation performed by an autonomous vehicle. The server computing system includes a processor and memory that stores instructions that are executed by the processor. The server computing system is configured to control the autonomous vehicle to perform one or more operations, wherein data indicative of an actual power consumption by the autonomous vehicle is generated based on the one or more operations. The operation performed by the autonomous vehicle is typically controlled to at least one of measure or isolate an effect of a variable on the actual power consumption by the autonomous vehicle. The data indicative of the actual power consumption is received by the server computing system to determine whether energy efficiency of the autonomous vehicle has degraded; such determination can be made based on the data indicative of the projected power consumption and the data indicative of the actual power consumption. An output is generated by the server computing system that is indicative of the degradation in energy efficiency of the autonomous vehicle (e.g., the output can specify whether the energy efficiency of the autonomous vehicle has degraded and/or an amount of degradation in the energy efficiency).

The data indicative of the projected power consumption for the operation performed by the autonomous vehicle may be received from the autonomous vehicle and/or an external data source, whereas data indicative of the actual power consumption is generally received from the autonomous vehicle. For example, the autonomous vehicle may transmit first data that identifies a pre-operation power level of a battery and, upon execution of the operation, transmit second data that identifies a post-operation power level of the battery. The server computing system can then determine the actual power consumption for the operation based on a difference between the pre-operation power level and the post-operation power level.

The operation performed by the autonomous vehicle may be selected from a plurality of operations based on a number of relevant factors for the autonomous vehicle (e.g., miles traveled, kilowatt hours consumed, exceeding a predetermined timeframe since the operation was last performed, etc.) to identify degradations in energy efficiency. Further, the autonomous vehicle may be controlled to perform a first operation to identify a vehicle system that causes the degradation in energy efficiency and controlled to perform a second operation to identify a system component included in the vehicle system, wherein the system component is a root cause of the degradation in energy efficiency of the vehicle system. In some cases, a regression analysis can be performed based on the effect of the variable on the actual power consumption to identify the variable that causes the degradation in energy efficiency. A variable that causes a degradation in energy efficiency of the autonomous vehicle can include, but is not limited to, surface grade, surface roughness, ambient weather conditions, solar irradiance, weight of passengers and cargo, tire design, wheel alignment, tire pressure, HVAC system efficiency, electric drive motor efficiency, drive unit efficiency, ADSC operations, braking efficiency, wheel bearing friction, thermal resistance of cabin, and/or aerodynamic drag.

The output indicative of the degradation in energy efficiency may identify a vehicle system or a component of the autonomous vehicle that causes the degradation in energy efficiency based on the operation performed by the autonomous vehicle and can further include a service recommendation and/or instructions for the autonomous vehicle to navigate to a service hub (e.g., when a degraded energy efficiency of the autonomous vehicle is identified by the server computing system). Subsequent to generating the output, the server computing system is likewise configured to receive an indication that the autonomous vehicle has been serviced and, based on the indication of service, control the autonomous vehicle to reperform the operation to verify whether the degradation in energy efficiency of the autonomous vehicle has improved.

In embodiments, the operation performed by the autonomous vehicle may be a general operation performed by one or more autonomous vehicles in a fleet of autonomous vehicles to identify whether the data indicative of the actual power consumption is within a normal range based on the data indicative of the projected power consumption. When the data indicative of the actual power consumption is outside the normal range, the server computing system can determine whether to identify and/or remediate the cause of the degradation in energy efficiency of the autonomous vehicle based on a cost of identifying or remediating the cause of degradation and a benefit of curing the cause of degradation. That is, the server computing system may be configured to execute instructions to identify and/or dispatch the vehicle to remediate the cause of degradation in energy efficiency, for example, only when the benefit of curing the degradation in energy efficiency exceeds the cost of leaving the degradation in energy efficiency uncured. If the power consumption of the autonomous vehicle is within the normal range or the cost of curing the degradation does not exceed the benefit, a next autonomous vehicle in the fleet of autonomous vehicles can be controlled to perform the general operation, wherein data indicative of an actual power consumption by the next autonomous vehicle is received based on the operation. Similarly, when the data indicative of actual power consumption by the next autonomous vehicle is outside the normal range, the server computing system can determine whether to identify or remediate a cause of degradation in energy efficiency of the next autonomous vehicle based on the cost of identifying or remediating the cause of degradation and the benefit of curing the cause of degradation to generate an output indicative of the determination for the next autonomous vehicle.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
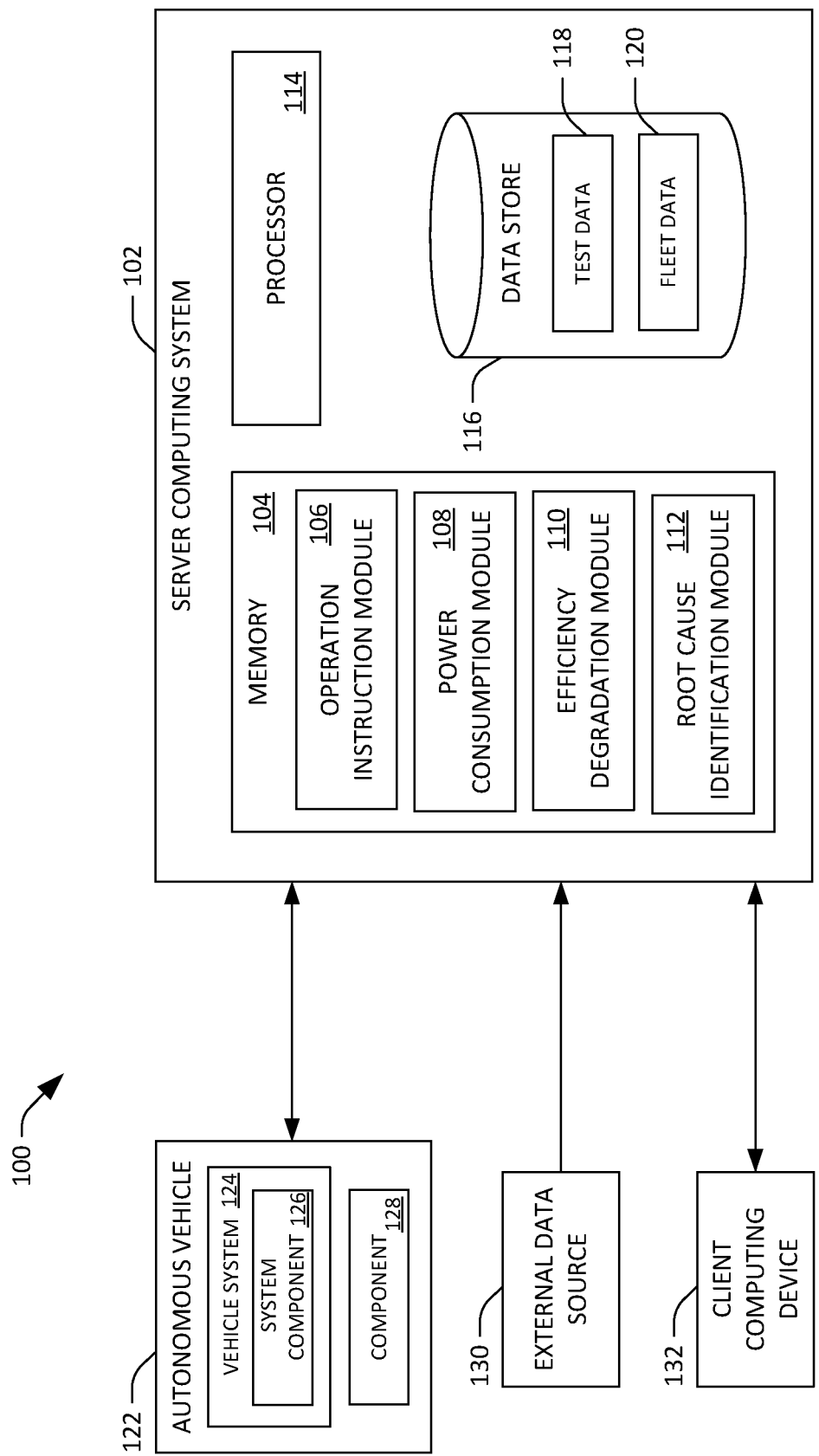
FIG. 1 illustrates an exemplary environment including a server computing system configured to identify a degradation in energy efficiency of an autonomous vehicle.

Various technologies pertaining to a system and method of energy efficient prognostics for an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B.

In addition, the articles "a" and "an" as used in this application and the appended claims should generally be construed to mean "one or more" unless specified otherwise or clear from the context to be directed to a singular form.

Further, as used herein, the terms "module" and "system" are intended to encompass computer-readable data storage that is configured with computer-executable instructions that cause certain functionality to be performed when executed by a processor. The computer-executable instructions may include a routine, a function, or the like. It is also to be understood that a module, or system may be localized on a single device or distributed across several devices.

Further, as used herein, the term "exemplary" is intended to mean serving as an illustration or example of something and is not intended to indicate a preference.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

With reference now to FIG. 1, an exemplary environment 100 is illustrated that includes a server computing system 102 in communication with an autonomous vehicle 122, an external data source 130, and a client computing device 132. The server computing system 102 is configured to identify a degradation in energy efficiency of the autonomous vehicle 122 and, in embodiments, determine a root cause of the degradation in energy efficiency. More specifically, the server computing system 102 includes a processor 114 and memory 104; the memory 104 includes computer-executable instructions configured to be executed by the processor 114 to perform energy efficiency prognostics for systems and components of the autonomous vehicle 122, which may be an autonomous vehicle included in a fleet of autonomous vehicles for which the server computing system 102 is configured to control and analyze.

Additionally or alternatively to being configured as a remote/stationary server computing system, one or more ADSC's incorporated in the fleet of autonomous vehicles can comprise the server computing system 102. For instance, vehicle-to-vehicle communication, such as cellular, wifi, etc., may be established based on spare ADSC computing capacity to transmit and receive data between the autonomous vehicle 122 and other autonomous vehicles in the fleet to identify the degradation in energy efficiency of the autonomous vehicle 122 by the one or more ADSC's, rather than by the remote/stationary server computing system. A component refers to an item incorporated in the autonomous vehicle 122 for which an energy efficiency determination for the item (e.g., a wheel bearing) is provided at its finest level of granularity, based on the data available to the server computing system 102. In contrast, a vehicle system refers to an item incorporated in the autonomous vehicle for which an energy efficiency determination by the server computing system 102 identifies an item (e.g., the HVAC system) that can be analyzed at more granular levels, based on the data available to the server computing system 102. For instance, while the server computing system 102 may output an energy efficiency determination for the HVAC system as a whole, the server computing system 102 may be likewise configured to identify the efficiencies of a compressor, an evaporator, and a condenser incorporated within the HVAC system, based on data available to the server computing system 102.

The energy efficiency prognostics for the systems and components of the autonomous vehicle 122 can be initiated by the server computing system 102 either automatically (e.g., based on a predetermined schedule and/or sensor outputs received from the autonomous vehicle 122) or via manual instructions from the client computing device 132 to perform a prognostic analysis. In some embodiments, the server computing system 102 receives data to perform prognostic analyses based on existing sensors and hardware that are already incorporated in the autonomous vehicle 122 for performing other functions. Further, the server computing system 102 may process data received from the autonomous vehicle 122 in real-time, or store and retrieve the data, as needed, as test data 118 in a data store 116 of the server computing system 102.

The memory 104 comprises a plurality of modules including an operation instruction module 106, a power consumption module 108, an efficiency degradation module 110, and a root cause identification module 112. The operation instruction module 106 is executed to generate instructions for controlling the autonomous vehicle 122 to perform one or more operations in accordance with a desired analysis. In embodiments, the one or more operations may include executing a general operation performed by autonomous vehicles in the fleet of autonomous vehicles to identify outlier vehicles based on energy efficiency determinations that result from execution of the general operation. In instances where an outlier vehicle is identified or, alternatively, when an autonomous vehicle is selected for energy efficiency analyses based on other criteria, the one or more operations may further correspond to a more specific protocol used to determine the energy efficiency of a specific component 128 and/or vehicle system 124 included in the identified autonomous vehicle 122 (e.g., to determine a cause of energy efficiency degradation of the autonomous vehicle 122).

In an example, the one or more operations may include controlling the autonomous vehicle 122 to navigate along a designated section of road having known characteristics, such as a known surface friction, length, grade, etc., to determine the impact that a component 128, such as a wheel bearing, may have on the amount of power consumed by the autonomous vehicle 122. In another example, the operation instruction module 106 may output instructions to operate a vehicle system 124, such as activating the HVAC system (e.g., in a controlled environment), to determine the energy efficiency of the vehicle system 124 as a whole. A controlled environment may include a climate-controlled environment or an environment that can include certain ambient conditions which correspond, for example, to weather data received from the external data source 130. The external data source 130 may be a weather station server, a server that controls a different fleet of autonomous vehicle, a server of a vehicle system/component manufacturer, and the like. A weather station server may provide external data indicative of current and historical weather conditions, whereas a vehicle system/component manufacture server and a server for a different fleet of autonomous vehicles may provide data indicative of characteristics of the component 128 or vehicle system 124 being analyzed by the server computing system 102.

The one or more operations are generally executed by the autonomous vehicle 122 such that variables which impact power consumption by the autonomous vehicle 122 are at least one of measurable or isolatable in combination with execution of the one or more operations. In embodiments, prognostic analyses for systems and components of the autonomous vehicle 122 may be distinguished based on five exemplary categories:
 (1) Variables that are measurable and an impact on power consumption that is measurable;
 (2) Variables that are measurable and an impact on power consumption that is not measurable;
 (3) Variables that are isolatable and an impact on power consumption that is measurable;
 (4) Variables that are isolatable and an impact on power consumption that is not measurable; and
 (5) Variables that are neither measurable nor isolatable.

Accordingly, the operation instruction module 106 may control operation of an HVAC compressor to determine the energy efficiency thereof in accordance with the first category since testing variables, such as temperature, as well as the power consumed by the HVAC compressor are both directly measurable during operation of the HVAC compressor. Correspondingly, while the second category is based on variables that are also measurable during an operation defined by the operation instruction module 106, it differs from the first category of tests in that the impact of the operation on power consumption is not directly measurable. For instance, surface roughness of a road can impact power consumption, but the impact of the surface roughness of the road on the power consumption is not determinable in isolation from other variables, such as tire rolling resistance. For variables in this category, statistical methods such as principal component analysis (PCA) can be performed by the server computing system 102 to determine variables that are projected to have the greatest impact on power consumption over time.

In instances such as the third and fourth categories, where a variable is not directly measurable, the variable may be isolatable by the one or more operations defined by the operation instruction module 106. For example, the HVAC system could be switched on and off based on known conditions (e.g., HVAC house loads or known characteristics of a navigated section of road) to determine the impact that the efficiency of the HVAC system has on power consumption. Correspondingly, some variables may be isolatable but their impact on power consumption may still not be measurable. As with variables that are directly measurable, statistical methods such as PCA can be similarly performed by the server computing system 102 to determine values for isolatable variables that are projected to have the greatest impact on power consumption over time. In cases such as the fifth category, where variables can be neither measured nor isolated, prognostic analyses for the component 128 or vehicle system 124 may be performed manually during periodic vehicle inspections, wherein data can be obtained from inspected vehicle hardware and recorded in the data store 116 to supplement data that is desirable for any of the previously described techniques.

Operation instructions generated by the operation instruction module 106 are transmitted from the server computing system 102 to the autonomous vehicle 122. Prior to performing the one or more operations identified by the operation instruction module 106, the autonomous vehicle 122 can return a pre-operation power level (e.g., of a battery) to the server computing system 102, which is thereby provided to a power consumption module 108. The power consumption module 108 is configured to determine the amount of power consumed by execution of the one or more operations by the autonomous vehicle 122. Accordingly, subsequent to communicating the pre-operation power level to the server computing system 102, the autonomous vehicle 122 performs the one or more operations identified by the operation instruction module 106 and, upon completion thereof, further communicates a post-operation power level (e.g., of the battery) to the server computing system 102. The post-operation power level is similarly provided to the power consumption module 108, wherein the amount of power consumed by execution of the one or more operations is determined based on a difference between the pre-operation power level and the post-operation power level.

In another embodiment, the autonomous vehicle may store the pre-operation power level internally so that, when the post-operation power level is identified upon completion of the one or more operations, the pre-operation power level and the post-operation power level can be communicated to the server computing system 102 simultaneously from the autonomous vehicle 122. Additionally or alternatively, a computing system of the autonomous vehicle 122 can compute the power consumption based on execution of the one or more operations by measuring the difference between the pre-operation power level and the post-operation power level and communicate the difference (e.g., the power consumption) to the server computing system 102. In this manner, certain functionality of the power consumption module 108 may be bypassed based on computations performed at the autonomous vehicle 122.

An output from the power consumption module 108, or alternatively from the autonomous vehicle 122, that identifies the amount of power consumed by execution of the one or more operations is provided to the efficiency degradation module 110 to determine whether the energy efficiency of the autonomous vehicle 122 has degraded. The efficiency degradation module 110 can determine energy efficiency degradations of the vehicle system 124 and/or the component 128 based on test data 118 collected from the autonomous vehicle 122 upon prior executions of the one or more operations, or from fleet data 120 collected from other autonomous vehicles in the fleet that have similarly executed the one or more operations, wherein the fleet data 120 is indicative of energy efficiency degradations for similar vehicle systems and components. More specifically, test data 118 can be received from the autonomous vehicle 122 each time the one or more operations are executed by the autonomous vehicle 122. The test data 118 corresponds to an actual condition of the component 128 or the vehicle system 124 at the time the one or more operations were performed. Test data 118 can be accumulated over a plurality of testing cycles for the autonomous vehicle 122 so that degradation in energy efficiency of the autonomous vehicle 122 can be tracked over a period of time. The test data 118 may be compared to the output of the power consumption module 108, or alternatively to a power consumption output from the autonomous vehicle 122, which is indicative of a current condition of the component 128 or the vehicle system 124 to determine whether the energy efficiency of the component 128 or the vehicle system 124 has degraded.

Additionally or alternatively, fleet data 120 received from other autonomous vehicles in the fleet that have previously executed the one or more operations can be indicative of an expected power consumption by the component 128 or the vehicle system 124 that is being analyzed by the server computing system 102. The fleet data 120 may be used to define a normal range of power consumption for the autonomous vehicle 122, or portions thereof, such as the component 128 or the vehicle system 124, based on empirical data collected from the fleet. More specifically, each time the one or more operations are executed by the autonomous vehicles in the fleet, fleet data 120 can be received by the server computing system 102 and accumulated in the data store 116. Similar to test data 118, fleet data 120 accumulated from other autonomous vehicles in the fleet can be compared to the output of the power consumption module 108, or alternatively to a power consumption output from the autonomous vehicle 122, which is indicative of a current condition of the component 128 or the vehicle system 124 to determine whether the energy efficiency of the component 128 or the vehicle system 124 is in a degraded condition from a condition of the similar components and systems identified in the fleet data 120. That is, the efficiency degradation module 110 can determine whether the autonomous vehicle 122 is within the normal range of power consumption based on the fleet data 120.

If the efficiency of the autonomous vehicle 122 has degraded (e.g., beyond a certain amount), an indication can be provided to the root cause identification module 112 which is configured to identify a root cause of the degradation. An indication that the autonomous vehicle 112 has degraded can also be provided to the client computing device 132. For example, the client computing device 132 may display to a user of the client computing device 132, based on the indication, an identifier for the degraded autonomous vehicle 122. In instances where the client computing device 132 receives an indication of energy efficiency degradation from the server computing system 102, dispatch of the autonomous vehicle 122 to a service facility may be initiated at the client computing device 132 (e.g., through the server computing system 102 or through other communicative environments). The client computing device 132 may output a specific indication of the root cause of the energy efficiency degradation upon dispatch of the autonomous vehicle 122 to the service facility or the client computing device 132 may output a general indication that the energy efficiency of the autonomous vehicle 122 has degraded and that manual inspection or further physical tests are desirable to determine the root cause of the energy efficiency degradation. Data collected from the manual inspection or the further physical tests can be provided to the server computing system 102 as test data 118 that specifically corresponds to the autonomous vehicle 122 or as fleet data 120 to facilitate identification (e.g., by the server computing system 102) of similarly degraded components and systems of other autonomous vehicles in the fleet.

In some embodiments, the component 128 identified by the efficiency degradation module 110 may be the root cause of the degradation. In other embodiments, the root cause of the degradation may be a system component 126 included within the vehicle system 124 (e.g., a compressor included within the HVAC system) identified by the efficiency degradation module 110, wherein execution of further operations defined by the operation instruction module 106 may be desirable to identify the system component 126 within the vehicle system 124 that is causing the degradation. Accordingly, the root cause identification module 112 may output indications to the operation instruction module 106 to control the autonomous vehicle 122 to perform further operations configured to narrow the potential options for system components 126 that could be the root cause of the degradation. In an example, the output indications to the operation instruction module 106 may be based on techniques that correspond to a fault tree analysis.

Once a root cause component, such as the component 128 or the system component 126, has been identified by the root cause identification module 112, the server computing system 102 may output a recommendation that is displayed at the client computing device 132. The recommendation may include a specific replacement or service recommendation for the root cause component or a general recommendation to manually inspect the autonomous vehicle 122. The output from the server computing system 102 may also identify an expected remaining life of the root cause component. The server computing system 102 is additionally configured to instruct the autonomous vehicle 122 to navigate to a service facility based on energy efficiency degradations identified for the autonomous vehicle 122. Upon completion of servicing the autonomous vehicle 102, the server computing system 102 can instruct the autonomous vehicle 122 to repeat the one or more operations to determine and/or verify whether the energy efficiency of the autonomous vehicle 122 has improved.

Figure 2:
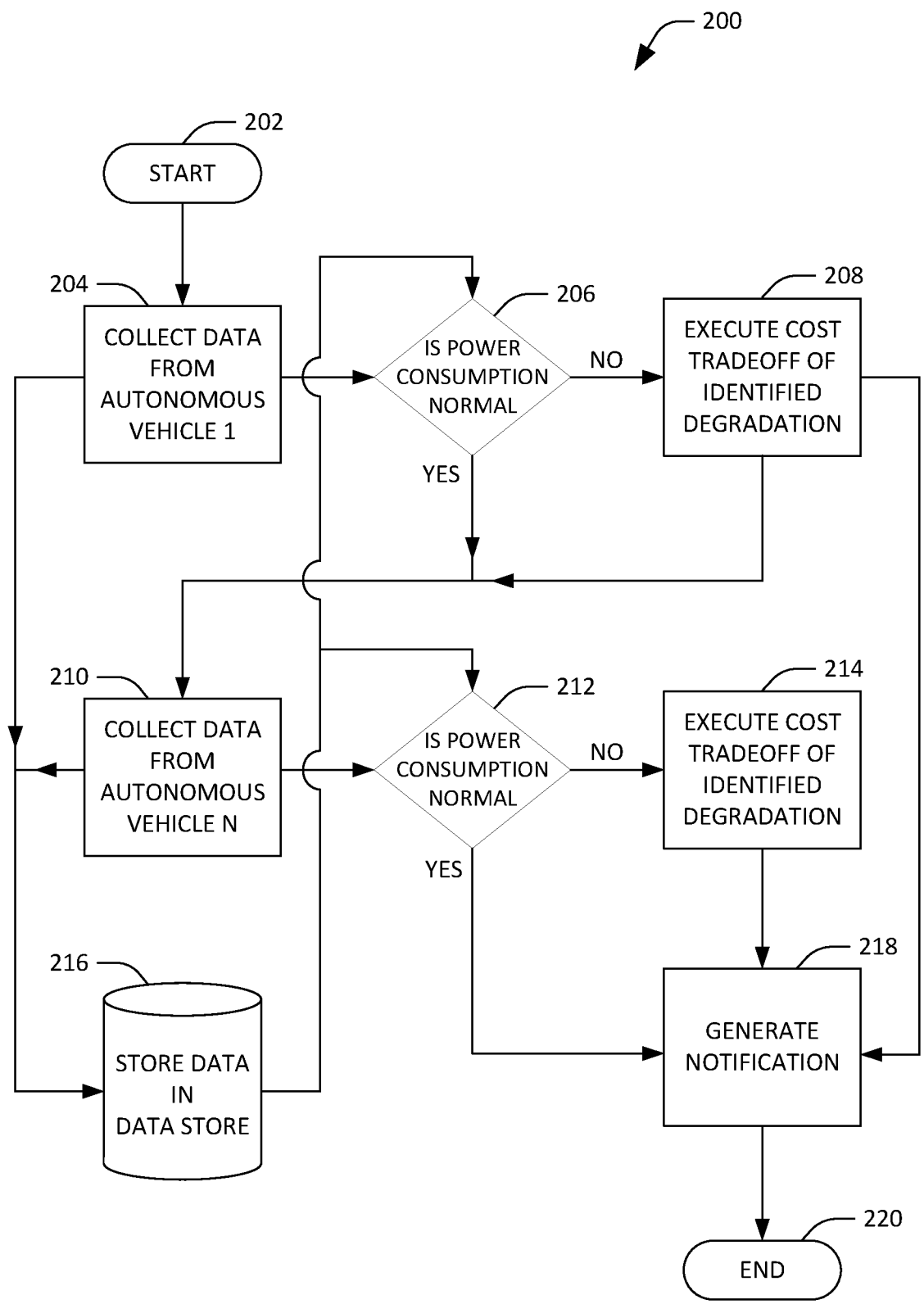
FIG. 2 illustrates an exemplary flow diagram for determining which autonomous vehicles in a fleet of autonomous vehicles should have a degraded vehicle system or component replaced.

With reference now to FIG. 2, flow diagram 200 illustrates a technique for determining which autonomous vehicles in a fleet of autonomous vehicles should have their degraded vehicle systems or components replaced. The flow diagram 200 starts at 202, and at 204 data is collected from a first autonomous vehicle in the fleet of autonomous vehicles based on execution of an operation. The operation may be a standardized operation such as navigating along a designated section of road having known characteristics, wherein the standardized operation is performed by a plurality of autonomous vehicles in the fleet of autonomous vehicles to accumulate comparable data in a data store. The data may be indicative of an overall power consumption required to execute the operation by the first autonomous vehicle, which is thereby further indicative of an overall energy efficiency of the first autonomous vehicle. At 216, the data is stored in a data store (e.g., a data store of a server computing system that instructs the autonomous vehicle to execute the operation).

Based on the data stored in the data store, it is determined at 206 whether the power consumption required to execute the operation by the first autonomous vehicle is within a normal range. The normal range of power consumption may be determined based on variables such as surface grade, surface roughness, ambient weather conditions, solar irradiance, weight of passengers and cargo, tire design, wheel alignment, tire pressure, HVAC system efficiency, electric drive motor efficiency, drive unit efficiency, ADSC operations, braking efficiency, wheel bearing friction, thermal resistance of cabin, aerodynamic drag, amongst others. If the power consumption is not within a normal range, a cost tradeoff of identifying the degradation (e.g., lost revenue, electricity costs, fuel costs, etc.) and/or a cost tradeoff of remediating an identified degradation (e.g., cost of replacement parts, additional travel time, opportunity costs of downtime, etc.) in the first autonomous vehicle is executed at 208. For instance, upon identification of a specific component or vehicle system driving the increased power draw, a cost tradeoff analysis can be performed to determine if part replacement should occur. Subsequent to executing the cost tradeoff at 208, a notification can be generated at 218 that is indicative of a result of the cost tradeoff analysis. The flow diagram 200 can then complete at 220.

If, at 206, the power consumption is determined to be within the normal range, or upon executing the cost tradeoff at 208, data can be collected from another autonomous vehicle in the fleet of autonomous vehicles. In particular, at 210, data is collected from an Nth autonomous vehicle in the fleet of autonomous vehicles based on execution of the operation (e.g., the standardized operation performed by the plurality of autonomous vehicles in the fleet of autonomous vehicles). At 216, the data collected from the Nth autonomous vehicle is similarly stored in the data store (e.g., the data store of the server computing system that instructs the Nth autonomous vehicle to execute the operation).

Based on the data stored in the data store, it is determined, at 212, whether the power consumption required to execute the operation by the Nth autonomous vehicle is within the normal range. The normal range of power consumption for the Nth autonomous vehicle may be similarly determined based on variables such as surface grade, surface roughness, ambient weather conditions, solar irradiance, weight of passengers and cargo, tire design, wheel alignment, tire pressure, HVAC system efficiency, electric drive motor efficiency, drive unit efficiency, ADSC operations, braking efficiency, wheel bearing friction, thermal resistance of cabin, aerodynamic drag, etc., and does not necessarily have to be based on the same variable used to determine the normal range of power consumption for the first autonomous vehicle. If the power consumption is not within the normal range, a cost tradeoff of identifying the degradation (e.g., lost revenue, electricity costs, fuel costs, etc.) and/or a cost tradeoff of remediating an identified degradation in the Nth autonomous vehicle (e.g., cost of replacement parts, additional travel time, opportunity costs of downtime, etc.) is executed at 214. For instance, upon identification of a specific component or vehicle system driving the increased power draw in the Nth autonomous vehicle, a cost tradeoff analysis can be performed to determine if part replacement should occur. Subsequent to executing the cost tradeoff at 214, a notification can be generated at 218 that is indicative of a result of the cost tradeoff analysis. The flow diagram 200 can then complete at 220. Alternatively, the flow diagram 200 may be completed at 220 if, at 212, the power consumption of the Nth autonomous vehicle is determined to be within the normal range and a notification is generated, at 218, that is indicative of the Nth autonomous vehicle being within the normal range of power consumption.

Figure 3:
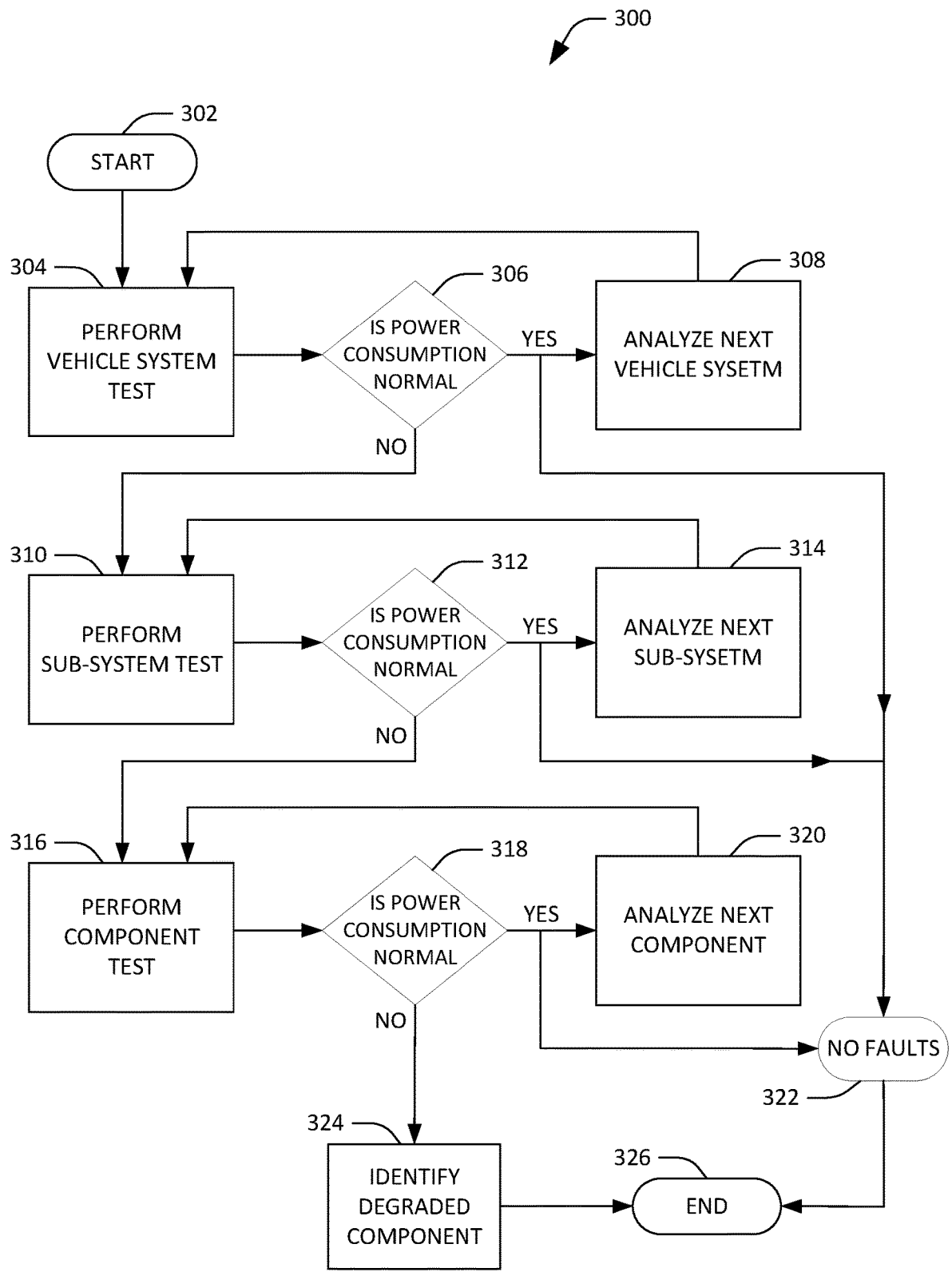
FIG. 3 illustrates an exemplary flow diagram for identifying a degraded component in an autonomous vehicle.

With reference now to FIG. 3, flow diagram 300 illustrates a technique for identifying a degraded component of an autonomous vehicle. The flow diagram 300 starts at 302, and at 304 a vehicle system test is performed. In embodiments, the vehicle system test may be configured to isolate variables that impact power consumption by a vehicle system during operation thereof. For example, a first vehicle system test can be performed to determine a propulsion profile. If, at 306, the power consumption of the vehicle system is determined to be within a normal range of power consumption, a next vehicle system, such as a cabin cooling system, can be selected for analysis at 308. The next vehicle system is similarly subjected to a vehicle system test performed at 304, wherein it is similarly determined, at 306, whether the next vehicle system is within the normal range of power consumption. If the next vehicle system is within the normal range of power consumption, the process can be repeated for another next vehicle system, such as a cabin cooling system. In the event that all vehicle systems tested at 304 are determined to be in the normal range of power consumption at 306, the flow diagram 300 can be completed at 326 based on having no faults, at 322, within the tested vehicle systems of the autonomous vehicle.

If, at 306, the power consumption for a tested vehicle system is determined to be outside the normal range of power consumption, a sub-system test can be performed at 310. In embodiments, the sub-system test may be configured to isolate variables that impact power consumption by a sub-system during operation thereof. For example, if the cabin heating system is outside the normal range of power consumption, a first sub-system test can be performed to generate a profile of a first sub-system, such as an air heating sub-system. If, at 312, the power consumption of the sub-system is determined to be within a normal range of power consumption, a next sub-system, such as a seat heating sub-system, can be selected for analysis at 314. The next sub-system is similarly subjected to a sub-system test performed at 310, wherein it is similarly determined, at 312, whether the next sub-system is within the normal range of power consumption. If the next sub-system is within the normal range of power consumption, the process can be repeated for another next sub-system. In the event that all sub-systems tested at 310 are determined to be in the normal range of power consumption at 312, the flow diagram 300 can be completed at 326 based on having no faults, at 322, within the tested sub-systems of the autonomous vehicle.

If, at 312, the power consumption for a tested sub-system is determined to be outside the normal range of power consumption, a component test can be performed at 316. In embodiments, the component test may be configured to isolate variables that impact power consumption by a component during operation thereof. For example, if the seat heating sub-system is outside the normal range of power consumption, a first component test can be performed to generate a profile of a first component, such as a front-left seat heater. If, at 318, the power consumption of the component is determined to be within a normal range of power consumption, a next component, such as a front-right seat heater, can be selected for analysis at 320. The next component is similarly subjected to a component test performed at 316, wherein it is similarly determined, at 318, whether the next component is within the normal range of power consumption. If the next component is within the normal range of power consumption, the process can be repeated for another next component, such as a back-left seat heater and/or a back right-seat heater. In the event that all components tested at 316 are determined to be in the normal range of power consumption at 318, the flow diagram 300 can be completed at 326 based on the tested components of the autonomous vehicle having no faults at 322.

If, at 318, the power consumption for a tested component is determined to be outside the normal range of power consumption, the degraded component is identified at 324 and the flow diagram 300 can complete at 326. For example, a back-left seat heater may be identified at 324 as having a degraded energy efficiency based on identifying the power consumption of the back-left seat heater as being outside the normal range of power consumption at 318. Accordingly, an output indicative of the back-left seat heater could be output at 324 to complete the flow diagram 300 at 326.

Additionally, it is to be appreciated from the foregoing that if a vehicle system does not comprise a sub-system, but only includes one or more components therein, then steps 310-314 may be bypassed to step 316 when it is determined, at 306, that the power consumption of the vehicle system is outside the normal range of power consumption. Similarly, it is to be appreciated from the foregoing that the technique for identifying a degraded component of the autonomous vehicle may comprise identifying a component that is not included within a vehicle system or sub-system. As such, steps 304-314 may be bypassed to step 316 to identify individual components of the autonomous vehicle that are determined, at 318, to be outside the normal range of power consumption.

Figure 4:
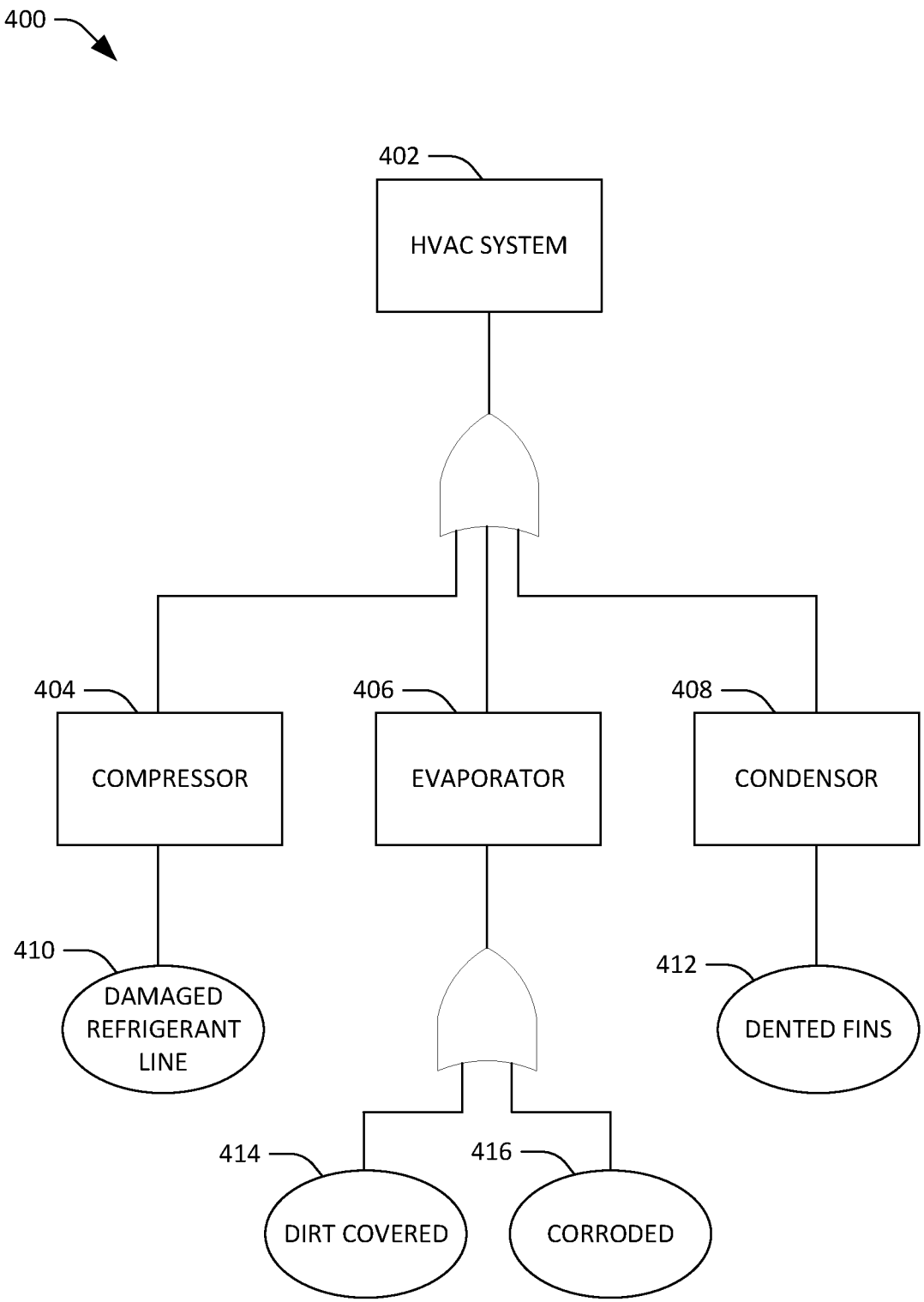
FIG. 4 illustrates an exemplary fault tree for a vehicle system.

With reference now to FIG. 4, an exemplary fault tree 400 is illustrated for a vehicle system of an autonomous vehicle. More specifically, the fault tree 400 corresponds to an HVAC system 402 of the autonomous vehicle. In embodiments, the HVAC system 402 can be selected for fault tree analysis based on techniques contemplated by flow diagram 300. That is, the autonomous vehicle can perform one or more operations (e.g., one or more vehicle system tests) to identify a vehicle system that is outside the normal range of power consumption of such a vehicle system. Once a vehicle system such as the HVAC system is identified, a fault tree analysis can be performed to determine a root cause of degradation in power consumption of the vehicle system, which is further indicative of a root cause of degradation in energy efficiency of the vehicle system.

The exemplary fault tree 400 may be arranged in accordance with techniques that are similarly contemplated by flow diagram 300, wherein a plurality of sub-systems and/or components of the vehicle system can be cycled through a plurality of testing protocols based on execution of one or more operations by the autonomous vehicle, until a degradation in power consumption is identified. The testing protocols may be individually configured to identify degradations in sub-systems and components of the vehicle system so that a root cause of the degradation in power consumption of the vehicle system can be determined from the fault tree analysis.

In the exemplary fault tree 400, a compressor 404, an evaporator 406, and a condenser 408 are included in the HVAC system 402. Each of the compressor 404, the evaporator 406, and the condenser 408 are individually tested to determine the energy efficiencies thereof. For example, a testing protocol may be executed to determine whether the compressor 404 has a damaged refrigerant line 410 (e.g., a crack in the line that causes a pump of the compressor 404 to consume more power due to a low amount of refrigerant to pump through the line). However, if the compressor 404 is determined to be within the normal range of power consumption, the condenser 408 may be analyzed next. For instance, the autonomous vehicle may execute a different operation to determine whether the condenser is experiencing reduced heat transfer, which can thereby be indicative of dented fins 412 of the condenser 408 caused by pebbles or debris launched from the road.

In some instances, a plurality of operations may be executed to analyze a plurality of potential causes of degradations to an aspect of the HVAC system 402. For example, a first testing protocol may be executed to determine whether the power consumption of an evaporator 406 is degraded based on the evaporator 406 being dirt covered 414, whereas a second testing protocol may be executed to determine whether the power consumption of the evaporator 406 is degraded based on the evaporator 406 being corroded 416. Power consumption and energy efficiency determinations resulting from a fault tree analysis, such as an analysis that corresponds to the exemplary fault tree 400, may provide one or more causes of degradation to the energy efficiency of the autonomous vehicle.

Figure 5:
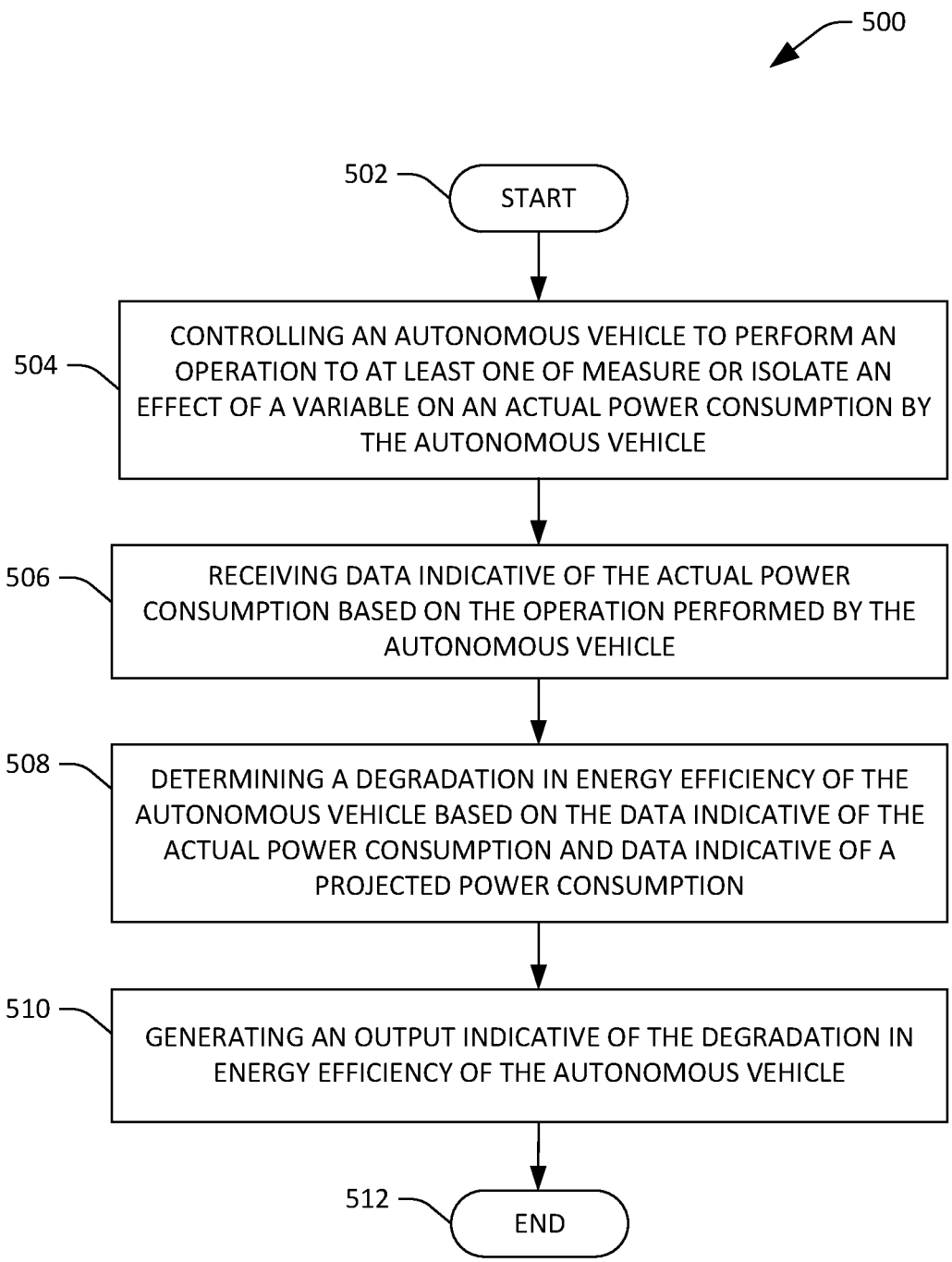
FIG. 5 is a flow diagram illustrating an exemplary methodology for identifying a cause of degradation in energy efficiency of an autonomous vehicle.
Figure 6:
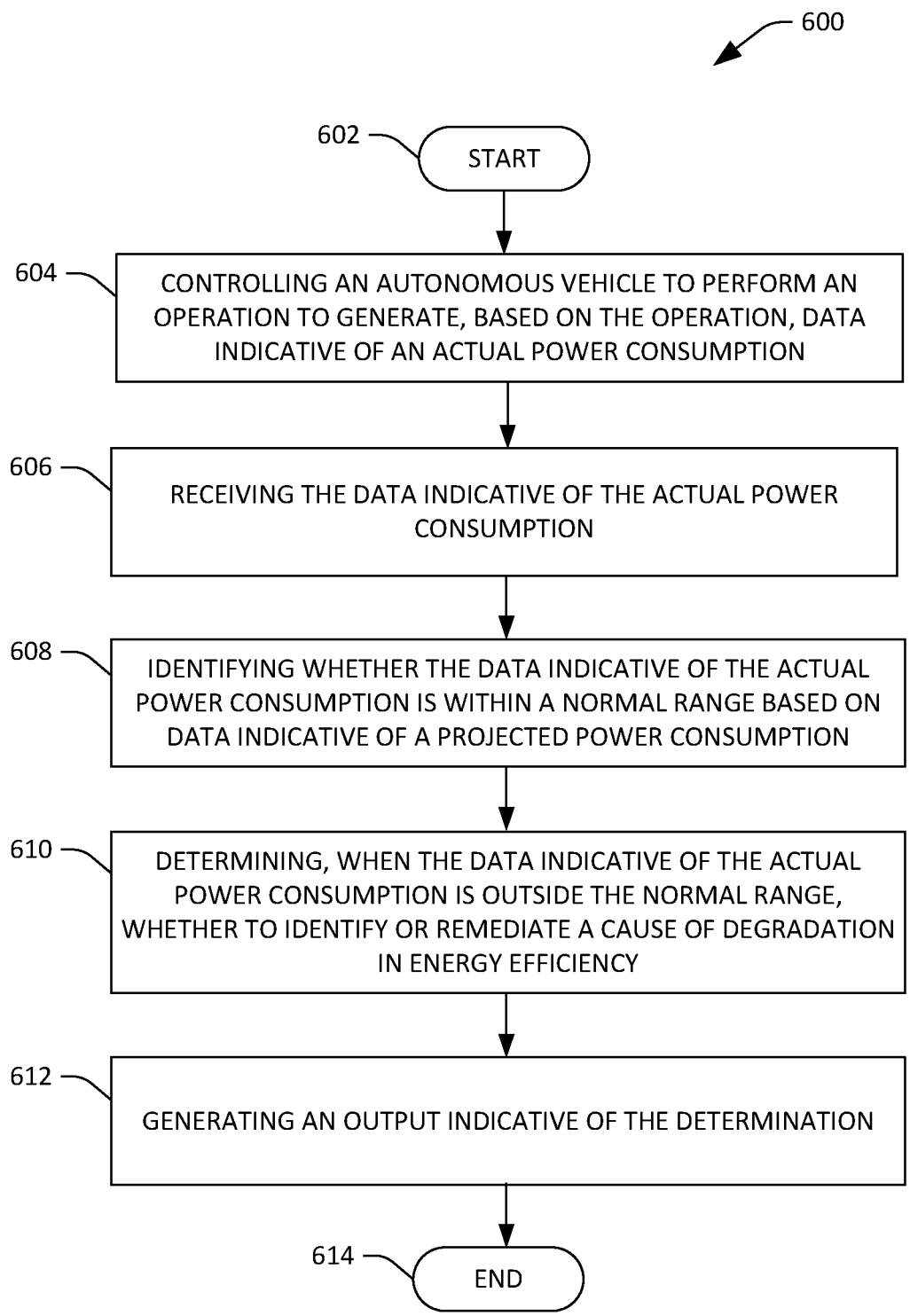
FIG. 6 is a flow diagram illustrating an exemplary methodology for determining whether to identify or remediate a cause of degradation in energy efficiency of an autonomous vehicle included in a fleet of autonomous vehicles.

FIGS. 5 and 6 illustrate exemplary methodologies relating to a system and method of energy efficiency prognostics. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 5, an exemplary methodology 500 is illustrated for energy efficiency prognostics. The methodology 500 starts at 502, and at 504 an autonomous vehicle is controlled to perform an operation, wherein data indicative of an actual power consumption by the autonomous vehicle is generated based on the operation. The operation is performed to at least one of measure or isolate an effect of a variable on the actual power consumption by the autonomous vehicle. At 506, the data indicative of the actual power consumption is received based on the operation performed by the autonomous vehicle. At 508, a degradation in energy efficiency of the autonomous vehicle is determined based on the data indicative of the actual power consumption and data indicative of a projected power consumption. The data indicative of the projected power consumption may be accumulated based on the operation being performed previously by the same or different autonomous vehicle. At 510, an output is generated that is indicative of the degradation in energy efficiency of the autonomous vehicle. The methodology 500 completes at 512.

Referring now to FIG. 6, an exemplary methodology 600 is illustrated for energy efficiency prognostics. The methodology 600 starts at 602, and at 604 an autonomous vehicle is controlled to perform an operation, wherein data indicative of an actual power consumption by the autonomous vehicle is generated based on the operation. At 606, the data indicative of the actual power consumption is received based on the operation performed by the autonomous vehicle. At 608, it is identified whether or not the data indicative of the actual power consumption is within a normal range of power consumption. The normal range of power consumption may be based on data indicative of a projected power consumption, which can be data that is accumulated based on the operation being performed previously by the same or different autonomous vehicle. At 610, when the data indicative of the actual power consumption is outside the normal range, a determination is made regarding whether or not to identify or remediate a cause of degradation in energy efficiency of the autonomous vehicle. The determination may be based on comparing a cost of identifying or remediating the cause of degradation to a benefit of curing the cause of degradation. At 612, an output is generated that is indicative of the determination. The methodology 600 completes at 614.

Figure 7:
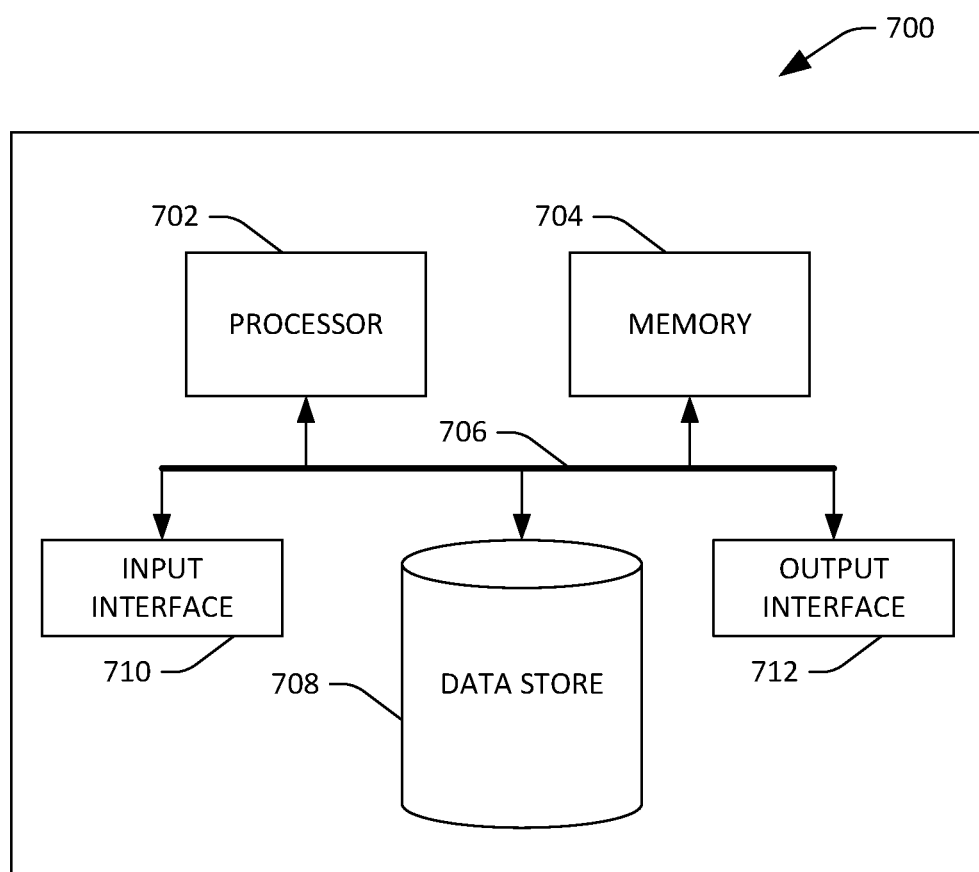
FIG. 7 illustrates an exemplary computing system.

Referring now to FIG. 7, a high-level illustration of an exemplary computing device 700 that can be used in accordance with the systems and methodologies disclosed herein is illustrated. For instance, the computing device 700 may be or include the server computing system 102. The computing device 700 includes at least one processor 702 that executes instructions that are stored in a memory 704. The instructions may be, for instance, instructions for implementing functionality described as being carried out by one or more modules and systems discussed above or instructions for implementing one or more of the methods described above. In addition to storing executable instructions, the memory 704 may also store geographic location information, external data, instructions from other systems and devices, etc.

The computing device 700 additionally includes a data store 708 that is accessible by the processor 702 by way of the system bus 706. The data store 708 may include the geographic location information, external data, executable instructions from the other systems and devices, etc. The computing device 700 also includes an input interface 710 that allows external devices to communicate with the computing device 700. For instance, the input interface 710 may be used to receive instructions from an external computer device, etc. The computing device 700 also includes an output interface 712 that interfaces the computing device 700 with one or more external devices. For example, the computing device 700 may transmit control signals to a vehicle propulsion system, a braking system, and/or a steering system of the autonomous vehicle 122 by way of the output interface 712.

Additionally, while illustrated as a single system, it is to be understood that the computing device 700 may be a distributed system. Thus, for instance, several devices may be in communication by way of a network connection and may collectively perform tasks described as being performed by the computing device 700.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the specification or the claims, such term is intended to be inclusive in a manner similar to the term "comprising" as "comprising" is interpreted when employed as a transitional word in a claim.

What is claimed is:

1. A server computing system, comprising:
   a data store, the data store comprises projected power consumption data for an operation performed by an autonomous vehicle;
   a processor; and
   memory that stores instructions that, when executed by the processor, cause the processor to perform acts comprising:
      controlling the autonomous vehicle to perform the operation, wherein data indicative of an actual power consumption by the autonomous vehicle performing the operation is generated responsive to the autonomous vehicle performing the operation, and wherein the operation is performed by the autonomous vehicle to at least one of measure or isolate an effect of a variable on the actual power consumption by the autonomous vehicle to detect whether a vehicle system of the autonomous vehicle is damaged;
      receiving the data indicative of the actual power consumption by the autonomous vehicle performing the operation;
      determining whether energy efficiency of the autonomous vehicle is degraded based on the projected power consumption data for the operation and the data indicative of the actual power consumption by the autonomous vehicle performing the operation, wherein degradation in the energy efficiency of the autonomous vehicle when performing the operation is indicative of damage to the vehicle system; and
      generating an output indicative of whether the vehicle system is damaged based on the degradation in the energy efficiency of the autonomous vehicle.

2. The server computing system of claim 1, the acts further comprising:
   identifying, based on the operation, a component of the vehicle system of the autonomous vehicle that causes the degradation in the energy efficiency, wherein the output is further indicative of the identified component.

3. The server computing system of claim 1, the acts further comprising:
   controlling the autonomous vehicle to perform a second operation, wherein data indicative of an actual power consumption by the autonomous vehicle performing the second operation is generated responsive to the autonomous vehicle performing the second operation, wherein the second operation is performed by the autonomous vehicle to at least one of measure or isolate an effect of a variable on the actual power consumption by the autonomous vehicle performing the second operation to detect whether a system component of the vehicle system is a root cause of the degradation in the energy efficiency of the vehicle system, and wherein the output is indicative of whether identified the system component is the root cause of the degradation in energy efficiency.

4. The server computing system of claim 1, the acts further comprising:
   performing a regression analysis based on the effect of the variable on the actual power consumption, wherein the variable that causes the degradation in the energy efficiency is identified based on output of the regression analysis.

5. The server computing system of claim 1, wherein the variable includes at least one of surface grade, surface roughness, ambient weather conditions, solar irradiance, weight of passengers and cargo, tire design, wheel alignment, tire pressure, heating ventilating and air conditioning (HVAC) system efficiency, electric drive motor efficiency, drive unit efficiency, autonomous driving system computer (ADSC) operations, braking efficiency, wheel bearing friction, thermal resistance of cabin, or aerodynamic drag.

6. The server computing system of claim 1, wherein receiving the data indicative of the actual power consumption further comprises:
   receiving first data that identifies a pre-operation power level of the autonomous vehicle; and
   receiving second data that identifies a post-operation power level of the autonomous vehicle, wherein the actual power consumption by the autonomous vehicle is determined based on a difference between the pre-operation power level and the post-operation power level.

7. The server computing system of claim 1, wherein the projected power consumption data for the operation performed by the autonomous vehicle is received from at least one of the autonomous vehicle or an external data source.

8. The server computing system of claim 1, the acts further comprising:
   selecting the operation for the autonomous vehicle to perform based on at least one of miles travelled, kilowatt hours consumed, or exceeding a predetermined timeframe since the operation was last performed.

9. The server computing system of claim 1, wherein the output indicative of whether the vehicle system is damaged based on the degradation in the energy efficiency includes at least one of a service recommendation or instructions for the autonomous vehicle to navigate to a service hub.

10. The server computing system of claim 1, the acts further comprising:
    subsequent to generating the output indicative of whether the vehicle system is damaged based on the degradation in the energy efficiency of the autonomous vehicle, receiving an indication that the autonomous vehicle has been serviced; and controlling the autonomous vehicle to reperform the operation to verify whether the degradation in the energy efficiency of the autonomous vehicle has improved.

11. A method performed by a server computing system, the method comprising:
controlling an autonomous vehicle to perform an operation, wherein data indicative of an actual power consumption by the autonomous vehicle performing the operation is generated responsive to the autonomous vehicle performing the operation, and wherein the operation is performed by the autonomous vehicle to at least one of measure or isolate an effect of a variable on the actual power consumption by the autonomous vehicle to detect whether a vehicle system of the autonomous vehicle is damaged;
receiving the data indicative of the actual power consumption by the autonomous vehicle performing the operation;
determining whether energy efficiency of the autonomous vehicle is degraded based on data indicative of a projected power consumption and the data indicative of the actual power consumption by the autonomous vehicle performing the operation, wherein degradation in the energy efficiency of the autonomous vehicle when performing the operation is indicative of damage to the vehicle system; and
generating an output indicative of whether the vehicle system is damaged based on the degradation in the energy efficiency of the autonomous vehicle.

12. The method of claim 11, the acts further comprising:
identifying, based on the operation, a component of the vehicle system of the autonomous vehicle that causes the degradation in the energy efficiency, wherein the output is further indicative of the identified component.

13. The method of claim 11, the acts further comprising:
controlling the autonomous vehicle to perform a second operation, wherein data indicative of an actual power consumption by the autonomous vehicle performing the second operation is generated responsive to the autonomous vehicle performing the second operation, wherein the second operation is performed by the autonomous vehicle to at least one of measure or isolate an effect of a variable on the actual power consumption by the autonomous vehicle performing the second operation to detect whether a system component of the vehicle system is a root cause of the degradation in the energy efficiency of the vehicle system, and wherein the output is indicative of whether the system component is the root cause of the degradation in the energy efficiency.

14. The method of claim 11, the acts further comprising:
performing a regression analysis based on the effect of the variable on the actual power consumption, wherein the variable that causes the degradation in the energy efficiency is identified based on output of the regression analysis.

15. The method of claim 11, wherein receiving the data indicative of the actual power consumption further comprises:
receiving first data that identifies a pre-operation power level of the autonomous vehicle; and
receiving second data that identifies a post-operation power level of the autonomous vehicle, wherein the actual power consumption by the autonomous vehicle is determined based on a difference between the pre-operation power level and the post-operation power level.

16. The method of claim 11, the acts further comprising:
receiving the data indicative of the projected power consumption for the operation performed by the autonomous vehicle from at least one of the autonomous vehicle or an external data source.

17. The method of claim 11, the acts further comprising:
selecting the operation for the autonomous vehicle to perform based on at least one of miles travelled, kilowatt hours consumed, or exceeding a predetermined timeframe since the operation was last performed.

18. A server computing system, comprising:
a data store, the data store comprises data indicative of a projected power consumption for an operation performed by an autonomous vehicle;
a processor; and
memory that stores instructions that, when executed by the processor, cause the processor to perform acts comprising:
controlling the autonomous vehicle to perform the operation, wherein data indicative of an actual power consumption by the autonomous vehicle performing the operation is generated responsive to the autonomous vehicle performing the operation;
receiving the data indicative of the actual power consumption by the autonomous vehicle performing the operation;
identifying whether the data indicative of the actual power consumption is within a normal range, wherein the normal range is based on the data indicative of the projected power consumption;
determining, when the data indicative of the actual power consumption is outside the normal range and is indicative of damage to a vehicle system of the autonomous vehicle, whether to at least one of identify or remediate a cause of degradation in energy efficiency of the autonomous vehicle based on at least one of a cost of identifying or a cost of remediating the cause of degradation and a benefit of curing the cause of degradation; and
generating an output indicative of the determination.

19. The server computing system of claim 18, the acts further comprising:
executing instructions to at least one of identify or remediate the cause of degradation in the energy efficiency when the benefit of curing the degradation in the energy efficiency exceeds the cost of leaving the degradation in the energy efficiency uncured.

20. The server computing system of claim 18, the acts further comprising:
controlling a next autonomous vehicle in a fleet of autonomous vehicles to perform the operation, wherein data indicative of an actual power consumption by the next autonomous vehicle performing the operation is generated responsive to the next autonomous vehicle performing the operation;
receiving the data indicative of the actual power consumption by the next autonomous vehicle performing the operation; and
determining, when the data indicative of actual power consumption by the next autonomous vehicle is outside the normal range and is indicative of damage to a vehicle system of the next autonomous vehicle, whether to at least one of identify or remediate a cause of degradation in energy efficiency of the next autonomous vehicle based on at least one of a cost of identifying or a cost of remediating the cause of degradation of the next autonomous vehicle and a benefit of curing the cause of degradation of the next autonomous vehicle, wherein the output is indicative of the determination for the next autonomous vehicle.

\* \* \* \* \*